United States Patent
Shalev et al.

(10) Patent No.: US 9,036,555 B2
(45) Date of Patent: *May 19, 2015

(54) DIRECT GENERATION OF DISCRETE FOURIER TRANSFORMS OF TIME-SHIFTED ZADOFF-CHU SEQUENCES

(71) Applicant: Marvell World Trade Ltd., St. Michael (BB)

(72) Inventors: Tal Shalev, Kfar Shmuel (IL); Ezer Melzer, Tel Aviv (IL); Kobby Pick, Beit Zait (IL)

(73) Assignee: MARVELL WORLD TRADE LTD, St. Michael (BB)

( * ) Notice: Subject to any disclaimer, the term of this patent is extended or adjusted under 35 U.S.C. 154(b) by 118 days.

This patent is subject to a terminal disclaimer.

(21) Appl. No.: 13/875,325

(22) Filed: May 2, 2013

(65) Prior Publication Data

US 2013/0242869 A1    Sep. 19, 2013

Related U.S. Application Data

(63) Continuation of application No. 12/877,106, filed on Sep. 8, 2010, now Pat. No. 8,442,129.

(60) Provisional application No. 61/265,244, filed on Nov. 30, 2009, provisional application No. 61/316,732, filed on Mar. 23, 2010.

(51) Int. Cl.
*H04L 27/26* (2006.01)
*H04J 13/00* (2011.01)
*H04J 13/14* (2011.01)

(52) U.S. Cl.
CPC ......... *H04L 27/2602* (2013.01); *H04J 13/0062* (2013.01); *H04J 13/14* (2013.01); *H04L 27/2628* (2013.01)

(58) Field of Classification Search
USPC .................. 370/210, 320; 375/259, 295, 260
See application file for complete search history.

(56) References Cited

U.S. PATENT DOCUMENTS

| | | | |
|---|---|---|---|
| 8,442,129 B2 | 5/2013 | Shalev et al. | |
| 2007/0230600 A1 | 10/2007 | Bertrand et al. | |
| 2008/0101306 A1 | 5/2008 | Bertrand et al. | |
| 2010/0195479 A1 | 8/2010 | Lipka et al. | |
| 2011/0176406 A1 | 7/2011 | Mauritz | |

OTHER PUBLICATIONS

3rd Generation Partnership Project TSG RAN TS 36.211, "Evolved Universal Terrestrial Radio Access (E-UTRA); Physical Channels and Modulation (Release 8)", version 8.3.0, section 5.7.2, pp. 36-39, May 2008.

(Continued)

*Primary Examiner* — Thai Nguyen

(57) ABSTRACT

A method includes accepting input values u and v, respectively identifying a $u^{th}$ root Zadoff-Chu sequence whose length is a prime number, and a $v^{th}$ cyclic shift for the sequence. Elements of a Discrete Fourier Transform (DFT) of the $v^{th}$ cyclic shift of the $u^{th}$ root Zadoff-Chu sequence are computed using processing circuitry, by evaluating a single respective exponent depending on u and v in computing each of the elements.

18 Claims, 2 Drawing Sheets

(56) References Cited

OTHER PUBLICATIONS

Texas Instruments, "PRACH Cyclic Prefixes Adjustment", 3GPP TSG RAN document R1-080200, 3 pages, Sevilla, Spain, Jan. 14-18, 2008.

Huawei, "Efficient Matched Filters for Paired Root Zadoff-Chu Sequences", 3GPP TSG RAN document R1-071409, 4 pages, St. Julian's, Malta, Mar. 26-30, 2007.

Beyme et al., "Efficient Computation of DFT of Zadoff-Chu sequences", Electronics Letters, vol. 45, No. 9, pp. 461-463, Apr. 23, 2009.

Weisstein, E. W., "Finite Field", MathWorld—A Wolfram Web Resource, 2 pages, 1999-2009 (http://mathworld.wolfram.com/FiniteField.html).

Weisstein, E. W., "Gaussian Sum", MathWorld—A Wolfram Web Resource, 1 page, 1999-2009 (http://mathworld.wolfram.com/GaussianSum.html).

U.S. Appl. No. 12/877,106 Office Action dated Nov. 7, 2012.

DIRECT GENERATION OF DISCRETE FOURIER TRANSFORMS OF TIME-SHIFTED ZADOFF-CHU SEQUENCES

CROSS-REFERENCE TO RELATED APPLICATIONS

This application is a continuation of U.S. patent application Ser. No. 12/877,106, filed Sep. 8, 2010, which claims the benefit of U.S. Provisional Patent Application 61/265,244, filed Nov. 30, 2009, and U.S. Provisional Patent Application 61/316,732, filed Mar. 23, 2010. The disclosures of all these related applications are incorporated herein by reference.

FIELD OF THE DISCLOSURE

The present disclosure relates generally to communication systems, and particularly to sequence generation in communication systems.

BACKGROUND

Zadoff-Chu (ZC) sequences are used in various communication applications. For example, mobile communication terminals in Evolved Universal Terrestrial Radio Access (E-UTRA) systems use ZC sequences for generating preambles for Random Access Channel (RACH) transmissions. RACH preamble generation in E-UTRA terminals is specified by the Third Generation Partnership Project (3GPP) Technical Specification Group Radio Access Network (TSG RAN) in Technical Specification TS 36.211, entitled "Evolved Universal Terrestrial Radio Access (E-UTRA); Physical Channels and Modulation (Release 8)," version 8.3.0, May, 2008, section 5.7.2, which is incorporated herein by reference.

Several schemes for preamble generation are known in the art. An example method is described in 3GPP TSG RAN document R1-080200, entitled "PRACH Cyclic Prefixes Adjustment," Sevilla, Spain, Jan. 14-18, 2008, which is incorporated herein by reference. Example methods for generating ZC sequences are described in 3GPP TSG RAN document R1-071409, entitled "Efficient Matched Filters for Paired Root Zadoff-Chu Sequences," St. Julian's, Malta, Mar. 26-30, 2007, and by Beyeme and Leung, in "Efficient Computation of DFT of Zadoff-Chu sequences," Electronics Letters, volume 45, No. 9, Apr. 23, 2009, pages 461-463, which are incorporated herein by reference.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

An embodiment that is described herein provides a method, which includes accepting input values u and v that respectively identify a $u^{th}$ root Zadoff-Chu sequence whose length is a prime number, and a $v^{th}$ cyclic shift for the sequence. Elements of a Discrete Fourier Transform (DFT) of the $v^{th}$ cyclic shift of the $u^{th}$ root Zadoff-Chu sequence are computed using processing circuitry, by evaluating a single respective exponent depending on u and v in computing each of the elements.

In some embodiments, the method further includes generating a preamble signal including the $v^{th}$ cyclic shift of the $u^{th}$ root Zadoff-Chu sequence using the elements. In an embodiment, generating the preamble signal includes generating the preamble for an Evolved Universal Terrestrial Radio Access (E-UTRA) uplink signal. In a disclosed embodiment, accepting the input values includes accepting the input values for the Zadoff-Chu sequence whose length equals one of 139 and 839. In an embodiment, the method includes transmitting the preamble signal to a receiver. In another embodiment, the method includes detecting a preamble in a received communication signal using the generated preamble signal.

In some embodiments, computing the elements includes recursively deriving a $k^{th}$ element of the DFT from a $(k-1)^{th}$ element of the DFT. Additionally or alternatively, computing the elements includes multiplying each of the elements by a sign factor dependent on u. In an embodiment, multiplying the elements includes retrieving the sign factor from a pre-computed list of sign factors dependent on u. In another embodiment, multiplying the elements includes expressing each sign factor using a respective Legendre symbol. In yet another embodiment, computing the elements includes evaluating an inverse of u in a finite field whose order is the prime number, and computing the elements using the inverse. In an embodiment, evaluating the inverse includes retrieving the inverse from a pre-computed list of inverses dependent on u.

There is additionally provided, in accordance with an embodiment that is described herein, apparatus that includes a memory and processing circuitry. The memory is configured to hold input values u and v, respectively identifying a $u^{th}$ root Zadoff-Chu sequence, whose length is a prime number, and a $v^{th}$ cyclic shift for the sequence. The processing circuitry is configured to compute elements of a Discrete Fourier Transform (DFT) of the $v^{th}$ cyclic shift of the $u^{th}$ root Zadoff-Chu sequence, by evaluating a single respective exponent depending on u and v in computing each of the elements. In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Zadoff-Chu (ZC) sequences are sequences of complex values of unit magnitude (phasors) that are used in various communication applications. For example, in E-UTRA systems (also referred to as Long-Term Evolution—LTE), the uplink Random Access Channel (RACH) comprises a preamble that is based on a shifted ZC sequence.

The $u^{th}$-root ZC sequence of length $N_{ZC}$ is a sequence of phasors $x_u[n]$ of the form $$x_u[n] = e^{-j\pi un(n+1)/N_{ZC}} \quad\quad \text{Equation 1}$$

$$n \in Z_{N_{ZC}} = \{0, 1, \ldots, N_{ZC} - 1\}.$$

The sequence length $N_{ZC}$ is typically a prime number. In LTE preambles, $N_{ZC}=139$ or 839 depending on the RACH format. The $v^{th}$ cyclic shift of the $u^{th}$-root ZC sequence is defined as $$x_{u,v}[n] = x_u[(n+C_v) \bmod N_{ZC}], \quad\quad \text{Equation 2:}$$

wherein $C_v$ denotes the (integer) number of sequence elements by which the sequence is shifted cyclically.

Embodiments that are described herein provide improved methods and devices for generating certain derivatives of ZC sequences. The disclosed techniques typically accept as input a certain requested length (denoted $N_{zc}$), a certain root (denoted u), and a certain cyclic shift (denoted v) for the sequence, and directly generate a Fourier Transform (typically a Discrete Fourier Transform—DFT, of length $N_{zc}$) of the $v^{th}$ cyclic shift of the $u^{th}$-root ZC sequence.

The methods and devices described herein generate the Fourier Transform elements directly from u and v, instead of (1) first cyclically shifting the root ZC sequence and then calculating the Fourier Transform of the shifted sequence by executing (in real time) the required operations according to the prescription of the DFT; or (2) Generating the DFT of the (non-shifted) ZC sequence, and "rotating" the result (multiplying each element of the resulting sequence by a suitable phasor) to compensate for skipping the cyclic shift in the initial DFT generation stage. Moreover, the disclosed techniques compute each element of the Fourier Transform by evaluating no more than a single (complex) exponent, which depends on u, v, and $N_{zc}$. Several example generation techniques and associated hardware configurations are described herein.

Since the disclosed techniques evaluate only a single exponent per Fourier element, they are highly efficient in terms of hardware complexity, memory size, latency and gate count. As a result, the physical size, power consumption and cost of the processing circuitry are reduced. Some of the disclosed schemes are recursive, i.e., compute a given element while reusing computations from (one or more) previous elements. In some embodiments, the methods and devices described herein are used for generating preambles in a transmitter, e.g., in an LTE UE. In alternative embodiments, the disclosed techniques are used for preamble detection in a receiver, e.g., in an LTE base station.

Figure 1:
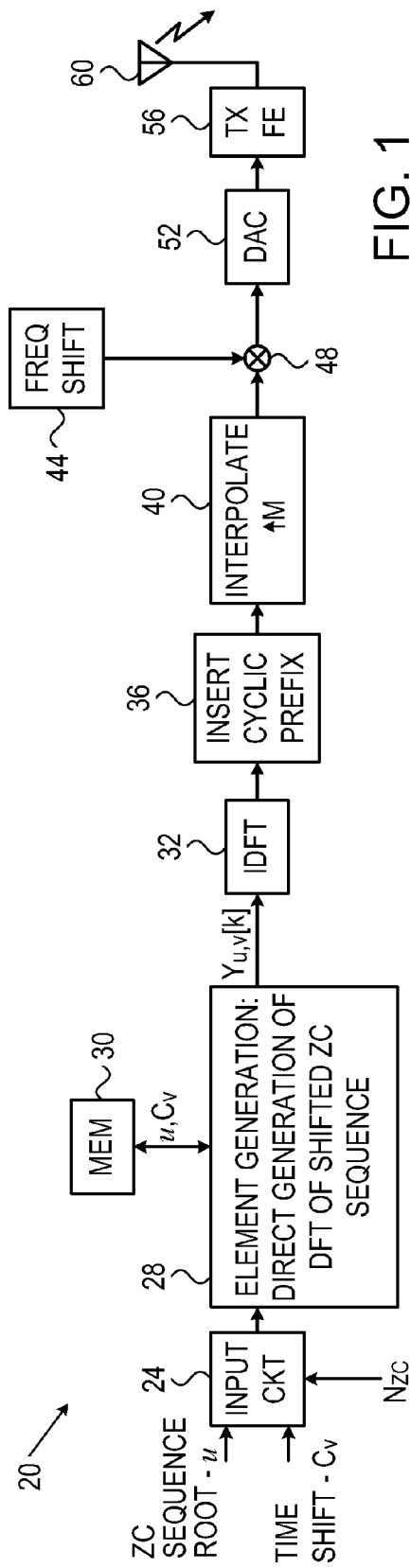
FIG. 1 is a block diagram that schematically illustrates a transmitter of a mobile communication terminal, in accordance with an embodiment of the present disclosure.

FIG. 1 is a block diagram that schematically illustrates a transmitter 20 of a mobile communication terminal, in accordance with an embodiment of the present disclosure. In the present example, transmitter 20 is used in a UE operating in accordance with the E-UTRA (LTE) specifications, cited above. Alternatively, a transmitter of this sort can be used in any other suitable communication system, including for example Code-Division Multiple Access (CDMA) and other related (e.g., Wideband-CDMA) communications systems. Note that FIG. 1 focuses on the RACH preamble generation aspects of the transmitter. As such, some transmitter elements that are not mandatory for understanding the disclosed techniques have been omitted from the figure for the sake of clarity.

Transmitter 20 comprises an input circuit 24, which accepts as input a desired root u and a desired cyclic shift $C_v$ for the ZC sequence to be generated. (In the description that follows, $C_v$ denotes the actual number of ZC sequence elements by which the desired sequence is shifted. In some embodiments, $C_v$ is selected from a predefined set of values, and circuit 24 accepts an index v that points to a certain value of $C_v$ within this set. The terms $C_v$ and v are used interchangeably herein.) In some embodiments, input circuit 24 also accepts the desired sequence length $N_{ZC}$, which typically comprises a prime number. In some embodiments, input circuit 24 is configurable (for example using an input flag or other selection interface) to select the value of $N_{ZC}$ from two or more predefined values, e.g., select between 139 and 839.

Input parameters u, $C_v$ and optionally $N_{ZC}$ are typically provided to circuit 24 by a controller or processor (not shown in the figure) that controls the UE, and in particular that determines the desired ZC sequence for generating the RACH preamble. Alternatively, however, the input parameters can be provided by any other suitable source.

Transmitter 20 further comprises an element generation unit 28, which comprises processing circuitry that generates $N_{ZC}$ DFT elements based on the input parameters accepted via input circuit 24. The DFT elements produced by unit 28 comprise the DFT of the $v^{th}$ cyclic shift of the $u^{th}$-root ZC sequence. By substituting Equation 2 above into Equation 1 above, the output of unit 28, namely the $N_{ZC}$ values denoted $Y_{u,v}[k]$ (indexed by $k=0, 1, \ldots, N_{ZC}-1$), can be written as $$Y_{u,v}[k] = DFT\{x_{u,v}[n]\} = \sum_{n=0}^{N_{ZC}-1} x_{u,v}[n] \cdot e^{-j2\pi nk/N_{ZC}} = \quad \text{Equation 3}$$

$$\sum_{n=0}^{N_{ZC}-1} [e^{-j\pi u(n+C_v)(n+1+C_V)/N_{ZC}} \cdot e^{-j2\pi nk/N_{ZC}}] k \in Z_{N_{ZC}}.$$

Efficient methods for producing $Y_{u,v}[k]$ are described further below. Unlike the general expression of Equation 3, which includes a sum of multiple exponents for every value of k, these methods compute each element $Y_{u,v}[k]$ by evaluating only a single exponent depending on u, v and $N_{zc}$. In some embodiments, unit 28 stores the input parameters (e.g., u, $C_v$, and $N_{zc}$) in a memory 30, which may comprise one or more registers or any other suitable memory.

The transmitter components described below convert $Y_{u,v}[k]$ into a RACH preamble, and transmit the preamble to a receiver (in the present example an LTE base station). Transmitter 20 comprises an Inverse DFT (IDFT) module 32, which calculates an L-size IDFT of $Y_{u,v}[k]$. In an embodiment, L=2048, although any other suitable value (possibly dependent on the rate of the subsequent digital-to-analog conversion in the transmitter) can also be used. In some implementations of an LTE uplink transmitter, L depends on the deployed bandwidth. In other words, module 32 converts $Y_{u,v}[k]$ from the frequency domain to the time domain. In an embodiment, module 32 calculates the IDFT using an Inverse Fast Fourier Transform (IFFT) process. A prefix insertion module 36 inserts a cyclic prefix preceding the IDFT of $Y_{u,v}[k]$.

An interpolation module 40 interpolates the time-domain sequence at the output of module 36 by a factor of M. In an embodiment, M=12 or 2, depending on the preamble format, although any other suitable value can also be used (e.g., in order to adjust the resulting discrete signal to the rate of the subsequent digital-to-analog conversion). In an embodiment, module 40 up-samples the time-domain sequence by a factor of M, and then filters the up-sampled sequence using a suitable Low-Pass Filter (LPF). A frequency shifting module 44 and a digital mixer 48 then apply a frequency shift to the output of interpolation module 40. For LTE, the frequency shift is specified in detail in section 5.7.1 of the TS 36.211 specification, cited above.

A Digital-to-Analog Converter (DAC) 52 converts the frequency-shifted sequence to an analog signal. The signal at the output of DAC 40 comprises a RACH preamble signal, which is based on the $v^{th}$ cyclic shift of the $u^{th}$-root ZC sequence. Modules 32, 36, 40, 44, 48 and 52 are therefore referred to collectively as preamble generation circuitry.

A transmitter front-end (TX FE) 56 up-converts the preamble signal to a suitable Radio Frequency (RF), and the RF signal is transmitted toward the receiver via an antenna 60. Note that some transmitter elements, e.g., a data transmission path, have been omitted from the figure for the sake of clarity.

The configuration of transmitter 20 in FIG. 1 is an example configuration, which is chosen solely for the sake of clarity. In alternative embodiments, any other suitable configuration can also be used. The different elements of transmitter 20 are typically implemented using dedicated hardware, such as using one or more Application-Specific Integrated Circuits (ASICs) and/or Field-Programmable Gate Arrays (FPGAs). Alternatively, some transmitter elements may be implemented using software running on programmable hardware, or using a combination of hardware and software elements. In some embodiments, some or all of the elements of transmitter 20 may be fabricated in a chipset. When implementing the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

In an LTE application, the analog preamble signal at the output of DAC 52 is defined as $$s(t) = \beta_{PRACH} \sum_{k=0}^{N_{ZC}-1} \sum_{n=0}^{N_{ZC}-1} x_{u,v}[n] \cdot e^{-j2\pi nk/N_{ZC}} \cdot e^{j2\pi(k+\varphi+K(k_0+1/2))\Delta f_{RA}(t-T_{CP})},$$ Equation 4 wherein $0 \leq t < T_{SEQ} + T_{CP}$, and $T_{SEQ}$ and $T_{CP}$ denote certain (large) integer multiples of the basic sampling interval $T_S = 1/(30.72 \text{ MHz})$. The other parameters in Equation 4 are specified in the TS 36.211 specification, cited above.

The digital version of this signal (at the output of mixer 48) can be written as $$s_{u,v}[m] = s(mT_s) = \beta_{PRACH} \sum_{k=0}^{N_{ZC}-1} \sum_{n=0}^{N_{ZC}-1} x_{u,v}[n] \cdot e^{-j2\pi nk/N_{ZC}} \cdot e^{j2\pi(k+\varphi+K(k_0+1/2))\frac{(m-T_{CP}/T_S)}{2048K}},$$ Equation 5 where $f_S = 1/T_S$ is the sampling rate of the digital signal. In LTE applications, K=12 or 2, depending on the preamble format.

In some embodiments, unit 28 in transmitter 20 computes the $N_{ZC}$ DFT elements $Y_{u,v}[k]$, k=0 ... $N_{ZC}$-1 using finite-field (Galois-field) arithmetic operations, using the following definitions: The set $Z_p = Z/pZ$ denotes the residue classes of the integers Z, modulo the prime number p. In the present application, $p = N_{ZC}$, and in LTE $N_{ZC}$=139 or 839. The set $Z_p$ is a finite field, also referred to as a Galois field of prime order p and denoted GF(p). As such, $Z_p$ is closed under arithmetic operations, and in particular under division. Moreover, the inverse under multiplication in GF(p) exists and is well defined, i.e., it is a single-valued function. For any integer a ($a \in Z$), let $(a)_p$ denote the unique element of $Z_p$ that satisfies $(a)_p \equiv a \pmod{p}$. For any $a \in Z$ for which $(a)_p \neq 0$, let $(a)_p^{-1}$ denote the inverse of a in $Z_p$, i.e., the unique non-zero element in $Z_p$ that satisfies $$a \cdot (a)_p^{-1} = (a)_p^{-1} \cdot a \equiv 1 \pmod{p}.$$

In some embodiments, unit 28 calculates the $k^{th}$ element of the DFT of the $v^{th}$ cyclic shift of the $u^{th}$-root ZC sequence by directly evaluating the expression $$Y_{u,v}[k] = J_{N_{ZC}} \sigma_u \sqrt{N_{ZC}} e^{j2\pi F_{u,v}[k]/N_{ZC}},$$ Equation 6:

wherein k=0, ..., $N_{ZC}$-1. As can be seen in Equation 6, each DFT value $Y_{u,v}[k]$ comprises only a single exponent that depends on u and v. The overall scaling factor of the phasor in Equation 6 is an example of a Gaussian sum.

The factor $J_{N_{ZC}}$ is defined as $$J_{N_{ZC}} = \frac{1 - j^{N_{ZC}}}{1 - j}.$$

In other words, $J_{N_{ZC}} = 1$ if $N_{ZC} \equiv 1 \pmod{4}$, and $J_{N_{ZC}} = j$ if $N_{ZC} \equiv 3 \pmod{4}$. The factors $\sigma_u$ are sign factors, which are formally defined in terms of the Legendre symbol $$\sigma_u = \left(\frac{-u/2}{N_{ZC}}\right) = \left(\frac{-u \cdot (2)_{N_{ZC}}^{-1}}{N_{ZC}}\right)$$

$$= \begin{cases} +1 & \text{if } \exists x \in Z \text{ s.t. } -u \cdot (2)_{N_{ZC}}^{-1} \equiv x^2 \pmod{N_{ZC}} \\ -1 & \text{otherwise.} \end{cases}$$ Equation 7

In some embodiments, the sign factors $\sigma_u$ are pre-calculated for various values of u and $N_{ZC}$ and stored in a Look-Up Table (LUT), either in unit 28 or at any other suitable location. The LUT size can be reduced to ($N_{ZC}$-1)/2 by using the symmetry $\sigma_{N_{ZC}-u} = -\sigma_u$. In alternative embodiments, unit 28 calculates the sign factors $\sigma_u$ according to Equation 7 when they are needed, e.g., in real time.

In some embodiments, unit 28 calculates the terms $F_{u,v}[k]$, which appear in the exponent of Equation 6 above, using a recursive (iterative) relation:

$$F_{u,v}[k] = \begin{cases} \alpha_u & k = 0 \\ F_{u,v}[k-1] + \beta_u \cdot (k+\gamma) + \delta_v & k > 0, \end{cases}$$ Equation 8 wherein $$\alpha_u = u \cdot (8)_{N_{ZC}}^{-1}; \beta_u = (u)_{N_{ZC}}^{-1}; \gamma = (2)_{N_{ZC}}^{-1} - 1 = \frac{N_{ZC}-1}{2};$$ Equation 9

$$\delta_v = C_v + (2)_{N_{ZC}}^{-1} = C_v + \frac{N_{zc}+1}{2}.$$

The constants in Equation 8, which depend on $N_{ZC}$ but not on k, can be calculated once for given u and $C_v$. In alternative embodiments, unit 28 calculates the terms $F_{u,v}[k]$ in Equation 6 above using a closed-form (non-recursive) expression:

$$F_{u,v}[k] = \beta_{2 \cdot u} \cdot k^2 + \delta_v \cdot k + \alpha_u \pmod{N_{ZC}}.$$ Equation 10:

Example values of the different k-independent constants in Equations 8-10, for $N_{ZC}=139$ and $N_{ZC}=839$ that are used in LTE RACH preambles, are provided in Appendix A further below.

In some embodiments, the values of $\beta_u$, the inverse of element u in $Z_{N_{ZC}}$, are pre-calculated in advance and stored in a LUT, either in unit 28 or at any other suitable location. The LUT size can be reduced to $(N_{ZC}-1)/2$ by using the symmetry $$(N_{ZC}-u)_{N_{ZC}}^{-1} = N_{ZC} - (u)_{N_{ZC}}^{-1}.$$

In alternative embodiments, unit 28 calculates the values of $\beta_u$ when they are needed, e.g., in real time.

In some embodiments, unit 28 evaluates the exponent in Equation 6 above in a simplified manner. When computing phasors of the form $\Phi(z) = e^{j2\pi z} = \cos(2\pi z) + j\sin(2\pi z)$, wherein z is a real number, it is possible to use the fact that $\Phi(z)=\Phi(\{z\})$, wherein $\{z\}=z-\lfloor z \rfloor$ denotes the fractional value of z and $\lfloor z \rfloor$ denotes the integer value of z. When evaluating Equation 6 above, the positive integers $F_{u,v}[k]$ does not require any modulo operations, since the phasors in question depend only on the fractional part of the real numbers $z=F_{u,v}[k]/N_{ZC}$. These values can be derived from a fixed-point representation of z as the product of $F_{u,v}[k]$ and $(1/N_{ZC})$. Moreover, because of the symmetry properties of the sine and cosine functions, it is possible to derive the values of $\text{Re}\Phi(\{z\})$ and $\text{Im}\Phi(\{z\})$ for any $0\le\{z\}<1$, without any arithmetical operations, given the values of $\sin(2\pi x)$ in the region $0\le x\le\frac{1}{8}$. In an embodiment, unit 28 may hold a LUT of sine function values $$S_q = \sin\left(\frac{\pi q}{4Q}\right), q = 0, 1, \ldots, Q,$$

wherein Q is chosen according to the desired accuracy of the output phasor sequence.

Figure 2:
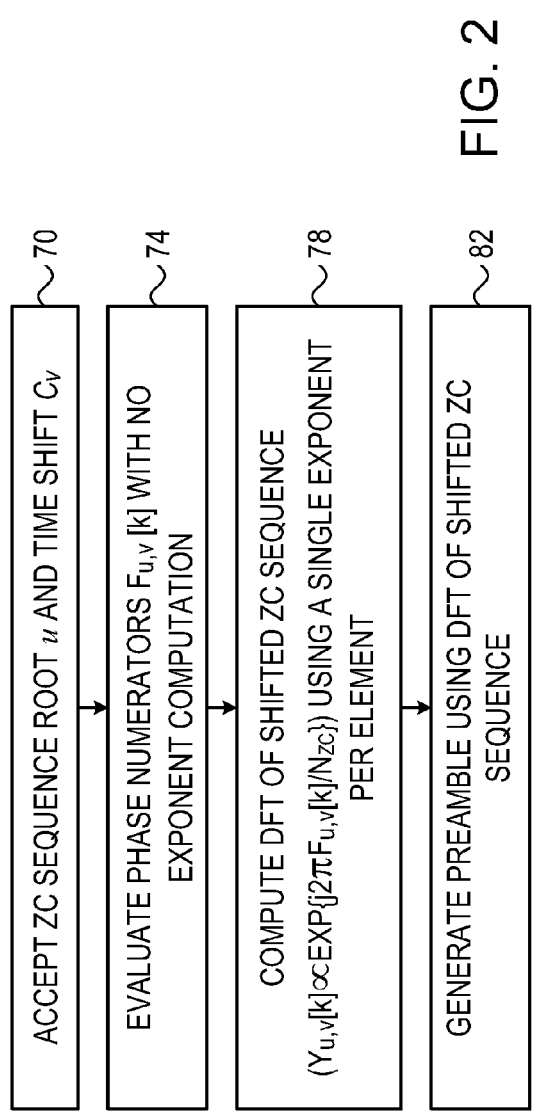
FIG. 2 is a flow chart that schematically illustrates a method for generating a preamble using shifted Zadoff-Chu (ZC) sequences, in accordance with an embodiment of the present disclosure.

FIG. 2 is a flow chart that schematically illustrates a method for generating a preamble using shifted Zadoff-Chu (ZC) sequences, in accordance with an embodiment of the present disclosure. The method begins at an input operation 70, with input circuit 24 accepting desired values of u and $C_v$, i.e., a root ZC sequence and a cyclic shift that is to be applied to the sequence. In an embodiment, transmitter 20 stores the accepted values of u and $C_v$ in memory 30.

At a term calculation operation 74, unit 28 calculates the terms (phase numerators) $F_{u,v}[k]$, $k=0\ldots N_{ZC}-1$. Unit 28 may perform this calculation using the recursive process of Equation 8 above, using the closed-form expression of Equation 10 above, or using any other suitable method. At an element calculation operation 78, unit 28 computes a set of $N_{ZC}$ elements of the DFT of the $v^{th}$ cyclic shift of the $u^{th}$-root ZC sequence. In an embodiment, unit 28 computes the DFT elements $(Y_{u,v}[k], k=0\ldots N_{ZC}-1)$ by evaluating Equation 6 above. As seen in Equation 6, unit 28 evaluates only a single complex exponent depending on u and v in computing each element (i.e., for each k).

At a preamble generation operation 82, transmitter 20 generates an LTE RACH preamble using the sequence of DFT elements produced by unit 28. In the embodiment of FIG. 1 above, the transmitter applies IDFT to the sequence DFT elements, inserts a cyclic prefix, interpolates by M, applies a frequency shift, and then converts the resulting preamble signal to analog. The preamble is then transmitted toward the receiver. In alternative embodiments, preamble generation using the disclosed techniques is performed in the receiver, for preamble detection purposes.

Figure 3:
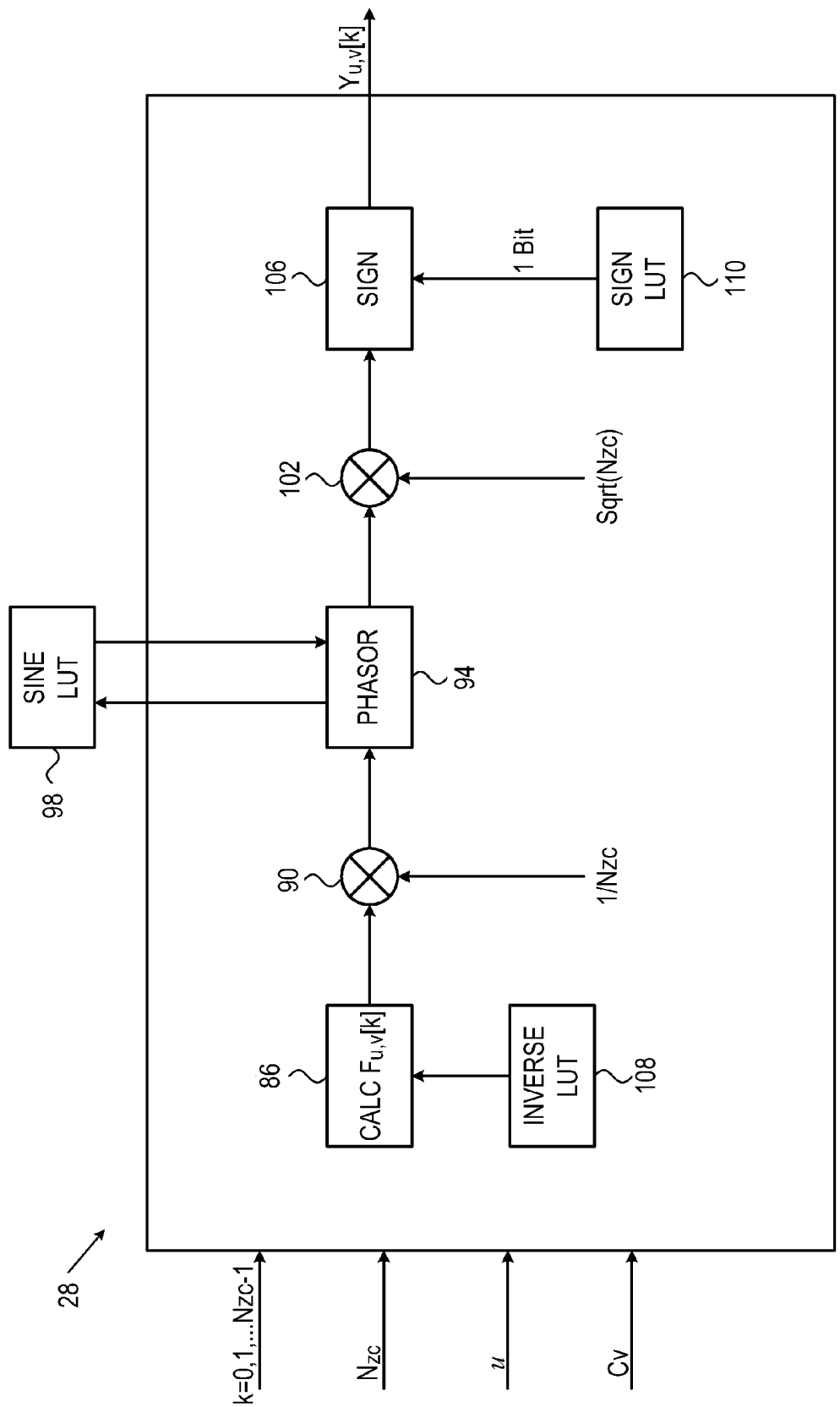
FIG. 3 is a block diagram that schematically illustrates circuitry for direct generation of a Discrete Fourier Transform (DFT) of a shifted ZC sequence, in accordance with an embodiment of the present disclosure.

FIG. 3 is a block diagram that schematically illustrates an example of suitable processing circuitry for direct generation of a Discrete Fourier Transform (DFT) of a shifted ZC sequence, in accordance with an embodiment of the present disclosure. The circuitry of FIG. 3 can be used to implement unit 28 of transmitter 20, for example. In this configuration, unit 28 accepts as input k, $N_{ZC}$, u, and $C_v$. In addition, unit 28 accepts the value of $(u)_{N_{ZC}}^{-1}$ from an inverse LUT 108. The circuitry of unit 28 evaluates Equation 6 above.

A term calculation module 86 evaluates the integers $F_{u,v}[k]$, e.g., using the recursive process of Equation 8 above or the closed-form expression of Equation 10 above. A multiplier 90 multiplies $F_{u,v}[k]$ by $(1/N_{ZC})$. An exponentiation module 94 exponentiates (i.e., calculates the exponent of $\sqrt{-1}\cdot 2\pi$ times) the output of multiplier 90. In the present example, as explained above, module 94 performs exponentiation using a LUT 98 of sine function values. (Both LUT 108 and LUT 98 are $N_{ZC}$-dependent.) A multiplier 102 scales the resulting exponent (phasor) by $\sqrt{N_{ZC}}$. A sign multiplication module 106 multiplies the output of multiplier 10 by a sign factor $\sigma_u$. In the present example, module 106 obtains the sign factor from a LUT 110 of 1-bit pre-computed sign factors, as explained above. The resulting elements $Y_{u,v}[k]$ are provided as output. When $N_{ZC}\equiv 3 \pmod 4$, elements $Y_{u,v}[k]$ are further multiplied by $j=\sqrt{-1}$ before they are provided as output (this operation is not shown in the figure).

The configuration of unit 28 in FIG. 3 is an example configuration, which is chosen solely for the sake of clarity. In alternative embodiments, any other suitable configuration can also be used.

APPENDIX A

Example Constant Values

This appendix lists example values of the (k-independent) constants that appear in Equations 8-10 above. The constant values that are given in this appendix refer to $N_{ZC}=139$ and $N_{ZC}=839$, which are the values used in LTE RACH preambles. Since $N_{ZC}\equiv 3\pmod 4$ for both $N_{ZC}=139$ and $N_{ZC}=839$, $J_{139}=J_{839}=j$. The values listed in this appendix are given purely by way of example. In alternative embodiments, any other suitable values can also be used.

For $N_{ZC}=139$, $\alpha_u=87\cdot u$; $\gamma=69$; $\delta_v=C_v+70$. For u=1 . . . 69, $\beta_u=(u)_{139}^{-1}=[1, 70, 93, 35, 28, 116, 20, 87, 31, 14, 38, 58, 107, 10, 102, 113, 90, 85, 22, 7, 53, 19, 133, 29, 89, 123, 103, 5, 24, 51, 9, 126, 59, 45, 4, 112, 124, 11, 82, 73, 78, 96, 97, 79, 34, 136, 71, 84, 122, 114, 30, 131, 21, 121, 91, 72, 100, 12, 33, 95, 98, 74, 64, 63, 77, 99, 83, 92, 137]$. The sign factors are given by $\sigma_u=[1, -1, -1, 1, 1, 1, 1, -1, 1, -1, 1, -1, 1, -1, -1, 1, -1, -1, -1, 1, -1, -1, -1, 1, 1, -1, -1, 1, 1, 1, 1, -1, -1, 1, 1, 1, 1, -1, -1, 1, 1, 1, 1, -1, -1, 1, 1, -1, 1, 1, 1, 1, -1, 1, -1, 1, 1, -1, 1, 1, -1, 1, -1, -1, -1, -1, 1, 1, 1, 1, 1, -1, 1]$. For u=70 . . . 138, $\beta_u=139-\beta_{139-u}$ and $\sigma_u=-\sigma_{139-u}$.

For $N_{ZC}=839$, $\alpha_u=105\cdot u$; $\gamma=419$; $\delta_v=C_v+420$. For u=1 . . . 419, $\beta_u=(u)_{839}^{-1}=[1, 420, 280, 210, 168, 140, 120, 105, 373, 84, 534, 70, 710, 60, 56, 472, 691, 606, 265, 42, 40, 267, 73, 35, 537, 355, 404, 30, 434, 28, 406, 236, 178, 765, 24, 303, 771, 552, 796, 21, 573, 20, 800, 553, 578, 456, 482, 437, 137, 688, 510, 597, 95, 202, 778, 15, 368, 217, 128, 14, 784, 203, 293, 118, 142, 89, 551, 802, 304, 12, 130, 571, 23, 805, 179, 276, 316, 398, 308, 430, 694, 706, 465, 10, 306, 400, 704, 696, 66, 289, 461, 228, 415, 241, 53, 638, 173, 488, 339, 344, 108, 255, 391, 718, 8, 467, 494, 101, 585, 389, 257, 427, 297, 184, 518, 528, 545, 64, 698, 7, 735, 392, 191, 521, 443, 566, 621, 59, 826, 71, 269, 464, 757, 695, 752, 401, 49, 152, 670, 6, 720, 65, 751, 705, 758, 431, 605, 822, 473, 509, 789, 138, 170, 158, 249, 199, 668, 154, 591, 215, 370, 347, 664, 353, 539, 652, 628, 5, 700, 153, 682, 200, 97, 352, 676, 348, 602, 33, 75, 564, 445, 650, 541, 114, 322, 627, 673, 540, 657, 446, 123, 319, 313, 506, 327, 244, 477, 589, 156, 172, 743, 54, 62, 547, 618, 615, 381, 359, 558, 4, 672, 653, 323, 247, 160, 470, 58, 712, 567, 614, 634, 548, 380, 633, 619, 568, 377, 92, 425, 259, 385, 264, 821, 692, 432, 32, 662, 349, 502, 423, 94, 787, 511, 196, 363, 515, 214, 680, 155, 641, 478, 283, 388, 730, 102, 449, 111, 413, 230, 455, 794, 554, 453, 232, 19, 798, 22, 767, 131, 376, 613, 620, 713, 444, 659, 76, 524, 335, 418, 3, 630, 360, 252, 452, 577, 795, 801, 772, 90, 379, 617, 635, 63, 722, 529, 411, 113, 656, 651, 674, 354, 814, 36, 69, 828, 85, 440, 79, 410, 544, 723, 519, 193, 334, 562, 77, 442, 715, 192, 527, 724, 185, 213, 593, 364, 332, 195, 596, 788, 689, 474, 326, 645, 314, 278, 422, 600, 350, 99, 496, 342, 341, 499, 100, 732, 468, 162, 176, 238, 338, 741, 174, 164, 301, 26, 436, 792, 457, 208, 282, 588, 642, 245, 325, 508, 690, 823, 57, 623, 161, 493, 733, 9, 756, 707, 270, 227, 748, 290, 223, 207, 481, 793, 579, 231, 576, 555, 253, 110, 583, 103, 122, 649, 658, 565, 714, 522, 78, 532, 86, 136, 791, 483, 27, 810, 31, 604, 693, 759, 309, 296, 727, 258, 610, 93, 599, 503, 279, 837].

The sign factors for $N_{ZC}=839$ are given by $\sigma_u=[-1, -1, -1,$
−1, −1, −1, −1, −1, −1, −1, 1, −1, 1, −1, −1, −1, 1, −1, −1, −1,
−1, 1, −1, −1, −1, 1, −1, −1, 1, −1, 1, −1, 1, 1, −1, −1, −1, −1, 1,
−1, 1, −1, −1, 1, −1, −1, −1, −1, −1, −1, 1, 1, −1, −1, 1, −1, −1,
1, −1, −1, −1, 1, −1, −1, 1, 1, 1, 1, −1, 1, −1, −1, −1, −1, −1, 1,
1, 1, 1, −1, −1, 1, 1, −1, 1, −1, 1, 1, 1, −1, 1, −1, −1, 1, −1, 1,
1, −1, 1, −1, −1, 1, 1, 1, −1, −1, 1, −1, 1, 1, −1, −1, 1, −1, −1,
1, 1, −1, 1, −1, −1, −1, 1, 1, −1, −1, −1, −1, −1, 1, 1, 1, −1, 1,
−1, 1, −1, 1, −1, −1, 1, −1, −1, 1, −1, −1, −1, 1, −1, 1, −1, 1,
1, 1, 1, 1, 1, −1, −1, −1, −1, 1, 1, 1, 1, −1, −1, 1, −1, −1, 1,
1, 1, −1, 1, −1, 1, −1, −1, 1, 1, −1, −1, −1, 1, −1, −1, −1, −1, 1,
−1, −1, 1, 1, −1, −1, 1, 1, −1, 1, −1, 1, 1, 1, 1, −1, 1, 1, −1, 1,
−1, 1, 1, −1, −1, 1, 1, −1, 1, −1, −1, −1, −1, −1, 1, −1, −1, 1, 1,
1, 1, 1, 1, −1, −1, 1, 1, −1, −1, −1, −1, −1, −1, 1, 1, 1, 1, −1,
1, −1, 1, −1, 1, −1, −1, −1, −1, 1, 1, 1, 1, −1, −1, 1, 1, 1, −1,
−1, 1, 1, −1, 1, −1, 1, 1, 1, 1, −1, −1, −1, −1, 1, −1, 1, −1, −1, −1,
1, 1, −1, −1, −1, −1, −1, 1, 1, 1, −1, −1, 1, −1, −1, −1, −1, 1, 1, 1,
1, 1, −1, 1, −1, 1, −1, 1, 1, −1, −1, −1, −1, 1, −1, 1, 1, 1, 1,
−1, 1, 1, 1, −1, 1, 1, −1, −1, −1, 1, 1, −1, −1, −1, −1, −1, 1, −1,
1, 1, −1, 1, 1, 1, −1, 1, 1, 1, −1, 1, −1, −1, 1, −1, −1, −1, 1,
−1, 1, −1, −1, 1, −1, −1, −1, −1, −1, 1, 1, −1, −1, 1, 1, −1, 1,
−1, −1, 1, 1, 1, 1, −1, 1, −1, 1, 1, 1, 1, −1, −1, 1, 1, −1, −1, −1,
1, 1, 1, 1, 1, −1, 1, −1, −1, 1, 1, 1, 1, 1]. For u=420 . . . 838,
$\beta_u=839-\beta_{839-u}$ and $\sigma_u=-\sigma_{839-u}$.

Although the embodiments described herein mainly address preamble generation in certain digital communication systems, the methods and systems described herein can also be used in various other applications.

It is noted that the embodiments described above are cited by way of example, and that the present disclosure is not limited to what has been particularly shown and described hereinabove. Rather, the scope of the present disclosure includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
   accepting input values u and v, respectively identifying a $u^{th}$ root Zadoff-Chu sequence whose length is a prime number, and a $v^{th}$ cyclic shift for the sequence; and
   using processing circuitry, computing elements of a Discrete Fourier Transform (DFT) of the $v^{th}$ cyclic shift of the $u^{th}$ root Zadoff-Chu sequence, by evaluating each of the elements directly from u and v in a respective calculation that comprises no more than a single respective exponent depending on u and v.

2. The method according to claim 1, comprising generating a preamble signal comprising the $v^{th}$ cyclic shift of the $u^{th}$ root Zadoff-Chu sequence using the elements.

3. The method according to claim 2, wherein generating the preamble signal comprises generating a preamble for an Evolved Universal Terrestrial Radio Access (E-UTRA) uplink signal.

4. The method according to claim 3, wherein accepting the input values comprises accepting the input values for the Zadoff-Chu sequence whose length equals one of 139 and 839.

5. The method according to claim 2, comprising transmitting the preamble signal to a receiver.

6. The method according to claim 2, comprising detecting a preamble in a received communication signal using the generated preamble signal.

7. The method according to claim 1, wherein computing the elements comprises recursively deriving a $k^{th}$ element of the DFT from a $(k-1)^{th}$ element of the DFT.

8. The method according to claim 1, wherein multiplying the elements comprises retrieving a sign factor from a pre-computed list of sign factors dependent on u.

9. The method according to claim 1, wherein multiplying the elements comprises expressing each sign factor using a respective Legendre symbol.

10. The method according to claim 1, wherein computing the elements comprises evaluating an inverse of u in a finite field whose order is the prime number, and computing the elements using the inverse.

11. The method according to claim 10, wherein evaluating the inverse comprises retrieving the inverse from a pre-computed list of inverses dependent on u.

12. Apparatus, comprising:
   a memory, which is configured to hold input values u and v, respectively identifying a $u^{th}$ root Zadoff-Chu sequence, whose length is a prime number, and a $v^{th}$ cyclic shift for the sequence; and
   processing circuitry, which is configured to compute elements of a Discrete Fourier Transform (DFT) of the $v^{th}$ cyclic shift of the $u^{th}$ root Zadoff-Chu sequence, by evaluating each of the elements directly from u and v in a respective calculation that comprises no more than a single respective exponent depending on u and v.

13. The apparatus according to claim 12, comprising preamble generation circuitry that is configured to generate a preamble signal comprising the $v^{th}$ cyclic shift of the $u^{th}$ root Zadoff-Chu sequence using the elements.

14. The apparatus according to claim 12, wherein the processing circuitry is configured to recursively derive a $k^{th}$ element of the DFT from a $(k-1)^{th}$ element of the DFT.

15. The apparatus according to claim 12, wherein the processing circuitry is configured to express each sign factor using a respective Legendre symbol.

16. The apparatus according to claim 12, wherein the processing circuitry is configured to evaluate an inverse of u in a finite field whose order is the prime number, and to compute the elements using the inverse.

17. A mobile communication terminal comprising the apparatus of claim 12.

18. A chipset for processing signals in a mobile communication terminal, the chipset comprising the apparatus of claim 12.

* * * * *